S. SHOWN.
PLANT BED BURNER.
APPLICATION FILED MAY 2, 1910.
983,650.
Patented Feb. 7, 1911.
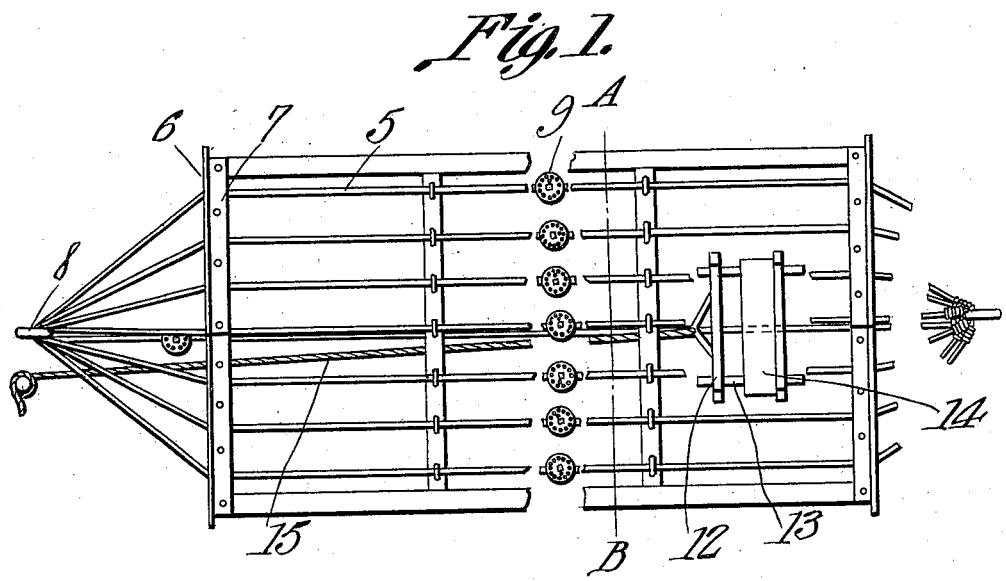
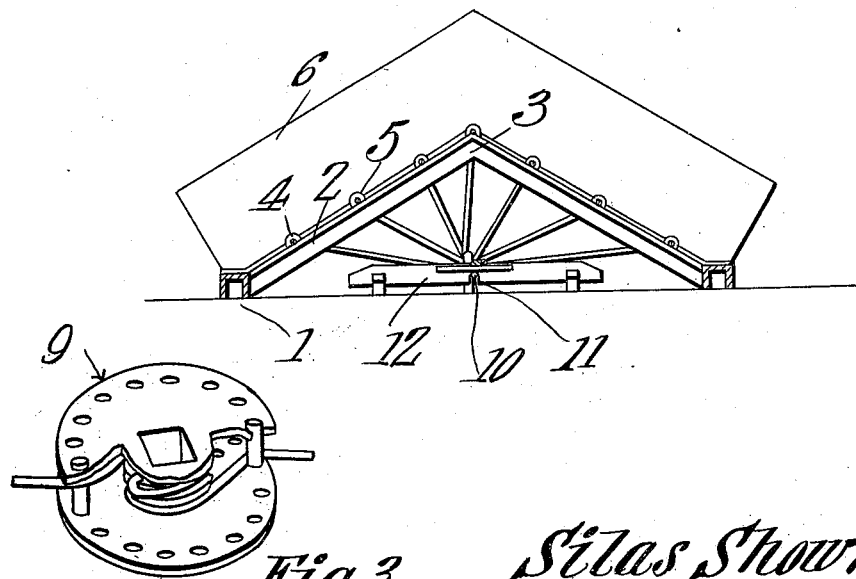
Witnesses
Silas Shown,
Inventor
by C. A. Snow & Co.
Attorneys

UNITED STATES PATENT OFFICE.

SILAS SHOWN, OF OWENSBORO, KENTUCKY.

PLANT-BED BURNER.

983,650.  Specification of Letters Patent.  Patented Feb. 7, 1911.

Application filed May 2, 1910. Serial No. 558,920.

*To all whom it may concern:*

Be it known that I, SILAS SHOWN, a citizen of the United States, residing at Owensboro, in the county of Daviess and State of Kentucky, have invented a new and useful Plant-Bed Burner, of which the following is a specification.

This invention relates to apparatus for burning plant beds in preparing ground for the reception of tobacco seed or any other seed which are preferably planted over a burned area.

One of the objects of the invention is to provide light and durable means for supporting vines, stalks and other undesirable growths at points above but close to the ground and providing means whereby said material may be ignited from beneath the pile so as to permit a large proportion of the generated heat to radiate into contact with the ground so as to properly burn it.

A further object is to provide a device of this character which can be readily set up and easily manipulated.

With these and other objects in view the invention consists in certain novel details of construction and combinations of parts hereinafter more fully described and pointed out in the claims.

In the accompanying drawings the preferred form of the invention has been shown.

In said drawings:—Figure 1 is a plan view of a portion of the device constructed in accordance with the present invention. Fig. 2 is a section on line A—B Fig. 1. Fig. 3 is a perspective view of one of the wire stretchers used in connection with the device, a portion thereof being broken away.

Referring to the figures by characters of reference 1 designates side strips preferably of metal and of any desired length, these side strips supporting upwardly extending inclined cross strips 2 which converge toward their upper ends and are brought together as shown at 3 so as to form an angular arch between the said side strips. These cross strips 3 have metal loops 4 or the like thereon and through which are threaded longitudinally extending wires 5. Upstanding metal retaining wings 6 are secured upon the end strips 2 and are preferably provided with base flanges 7 which are riveted or otherwise secured to said end strips and extend over the wires 5. Those portions of the wires extending beyond the end strips, converge toward and engage anchoring stakes 8 of any suitable construction, each of these wires being preferably provided with a wire tightener 9 such as shown in Patent No. 614,581, issued to me on November 22, 1898.

The two anchoring devices 8 are connected by a guide cable or wire 10 which is seated within notches or recesses 11 formed in cross strips 12, these strips being mounted on runners 13. The said runners and cross strips are preferably formed of metal or other material which will not be affected by heat and the said runners may support a platform 14 on which a torch of any preferred construction may be placed. An operating cable 15 is attached to one end of the carriage formed by the runners and cross strips and extends longitudinally within and beyond one end of the structure formed by the wires 5 and the cross strips 2.

In using the apparatus herein described the strips 1 and 2 are set up at the points where the plant bed is to be burned and the stakes 8 are forced into the ground and the ends of the wires connected to them. Said wires are then drawn tight by means of the tighteners 9 and thus coöperate with the cross strips 2 to form a grate having downwardly diverging portions spaced from the ground and on which the material to be burned may be placed. The carriage is arranged at one end of the device and the cable 15 extends to the other end thereof. The material to be burned is then arranged upon the grate to any desired depth after which a lighted torch is placed on the carriage and said carriage is drawn longitudinally under the grate from end to end, thus setting fire to the lowermost plants upon the grate. The heat radiating from the burning material will be directed against the ground and thoroughly burn or scorch it and the trash upon the grate will, at the same time, be consumed.

It is to be understood that this device can be of any desired length and by reason of its simplicity, can be quickly set up and taken apart.

Various changes can of course be made in the construction and arrangement of the parts without departing from the spirit or sacrificing any of the advantages of the invention.

What is claimed is:—

1. A plant bed burner consisting of anchoring devices, supporting elements interposed therebetween and a series of wires secured to the anchoring devices and mounted upon said supporting elements to constitute a grate.

2. A plant bed burner including anchoring devices, supporting elements interposed therebetween, wires secured to the anchoring devices and diverging toward said elements, said wires being extended along parallel lines above and being secured to the supporting elements to form a plant supporting grate.

3. A plant bed burner including a series of wires anchored at their ends, means for supporting intermediate portions of the wires above the ground to constitute a grate, and a torch carrier movably mounted beneath the wires.

4. A plant bed burner including longitudinally extending supporting devices anchored at their ends, means for holding said devices above the ground at intermediate points, said devices forming a fuel supporting grate, and a torch carrier movably mounted below said devices.

5. A plant bed burner including longitudinally extending devices anchored at their ends, means for supporting intermediate portions of said devices above the ground to constitute fuel supports, upstanding shields adjacent the ends of said devices, and a torch carrier movably mounted beneath the said devices.

6. A plant bed burner including upwardly converging supporting members, anchoring devices, flexible elements secured at their ends to the anchoring devices and mounted upon and held properly spaced by the supporting members, said devices constituting a fuel supporting grate, and means for drawing the said elements taut.

7. A plant bed burner including anchoring devices, upwardly extending supporting members interposed between the anchoring devices, flexible connections between the anchoring devices and mounted on the supporting members, means for drawing the said connections taut to form a fuel supporting grate, a torch carrier below the said connections and members, and means for drawing the carrier longitudinally beneath the said connections.

In testimony that I claim the foregoing as my own, I have hereto affixed my signature in the presence of two witnesses.

SILAS SHOWN.

Witnesses:
ALVEY BLANFORD,
CLYDE SHOWN.